(12) United States Patent
Manternach et al.

(10) Patent No.: US 9,440,690 B2
(45) Date of Patent: Sep. 13, 2016

(54) SUSPENSION FOR SCOOTER

(71) Applicants: Doug Manternach, Harding, PA (US); James Kosco, West Wyoming, PA (US); Brian Thomas, Luzerne, PA (US)

(72) Inventors: Doug Manternach, Harding, PA (US); James Kosco, West Wyoming, PA (US); Brian Thomas, Luzerne, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 0 days.

(21) Appl. No.: 14/086,421

(22) Filed: Nov. 21, 2013

(65) Prior Publication Data

US 2015/0137481 A1    May 21, 2015

(51) Int. Cl.
| | | |
|---|---|---|
| *B62K 5/007* | (2013.01) | |
| *B62D 53/02* | (2006.01) | |
| *B62D 21/12* | (2006.01) | |
| *B62D 21/11* | (2006.01) | |
| *B62K 15/00* | (2006.01) | |
| *B62K 5/00* | (2013.01) | |

(52) U.S. Cl.
CPC ............. *B62D 53/02* (2013.01); *B62D 21/11* (2013.01); *B62D 21/12* (2013.01); *B62K 5/007* (2013.01); *B62K 15/00* (2013.01); *B62K 2005/001* (2013.01); *B62K 2015/001* (2013.01)

(58) Field of Classification Search
CPC  B62K 5/025; B62K 5/003; B62K 2015/001; B62D 53/02; B62D 21/11; B62D 21/12
USPC ............................................. 280/400, 415.1
See application file for complete search history.

(56) References Cited

U.S. PATENT DOCUMENTS

| | | | | |
|---|---|---|---|---|
| 4,469,188 A | * | 9/1984 | Mita ............................. 180/215 |
| 4,534,438 A | * | 8/1985 | Mowat et al. ................ 180/209 |
| 4,633,962 A | * | 1/1987 | Cox et al. .................... 180/65.1 |
| 4,643,446 A | * | 2/1987 | Murphy et al. ............... 280/648 |
| 4,749,205 A | * | 6/1988 | Takahashi et al. ..... 280/124.116 |
| 4,944,359 A | * | 7/1990 | Doman et al. ............... 180/208 |
| 5,020,624 A | * | 6/1991 | Nesterick et al. ........... 180/210 |
| 5,036,938 A | * | 8/1991 | Blount et al. ................ 180/208 |
| 5,074,372 A | * | 12/1991 | Schepis ........................ 180/208 |
| 5,154,251 A | * | 10/1992 | Fought ......................... 180/208 |
| 5,228,533 A | * | 7/1993 | Mitchell ....................... 180/208 |
| 5,291,959 A | * | 3/1994 | Malblanc ........................ 180/11 |
| 5,695,021 A | * | 12/1997 | Schaffner et al. ............ 180/208 |
| 5,941,327 A | * | 8/1999 | Wu .............................. 180/65.1 |

(Continued)

FOREIGN PATENT DOCUMENTS

| | | |
|---|---|---|
| EP | 1 566 158 A2 | 8/2005 |
| EP | 1 950 130 A1 | 7/2008 |

(Continued)

*Primary Examiner* — Anne Marie Boehler
*Assistant Examiner* — Michael Stabley
(74) *Attorney, Agent, or Firm* — Baker & Hostetler, LLP

(57) ABSTRACT

A personal mobility scooter can include a front frame portion and a rear frame portion detachably coupled to the front frame portion. The front frame portion can have a front frame, at least one front wheel rotatably coupled to the front frame, and a rear suspension coupled to the front frame. The rear suspension can have at least one biasing member. The rear frame portion can have at least one rear attachment member, a pair of drive wheels, and at least one drive configured to power the drive wheels. The rear suspension is configured to (i) engage the at least one rear attachment member when the rear frame portion is coupled to the front frame portion and (ii) remain with the front frame portion when the rear frame portion is detached from the front frame portion.

18 Claims, 7 Drawing Sheets

(56) References Cited

U.S. PATENT DOCUMENTS

| | | | |
|---|---|---|---|
| 6,056,077 A * | 5/2000 | Kobayashi | 180/216 |
| 6,273,206 B1 * | 8/2001 | Bussinger | 180/208 |
| 6,336,517 B1 * | 1/2002 | Cheng | 180/208 |
| 6,439,331 B1 * | 8/2002 | Fan | 180/208 |
| 6,655,717 B1 * | 12/2003 | Wang | 280/781 |
| 6,672,606 B1 * | 1/2004 | Dwyer et al. | 280/124.165 |
| 6,761,238 B2 * | 7/2004 | Tagami et al. | 180/210 |
| 6,766,876 B2 * | 7/2004 | Ozeki et al. | 180/311 |
| 6,896,084 B2 * | 5/2005 | Lo | 180/208 |
| 7,044,249 B2 * | 5/2006 | Fan | 180/208 |
| 7,083,018 B2 * | 8/2006 | Luh | 180/65.1 |
| 7,234,557 B2 * | 6/2007 | Chen | 180/208 |
| 7,275,608 B2 * | 10/2007 | Lo | 180/11 |
| 7,401,675 B2 * | 7/2008 | Chang | 180/208 |
| 7,661,961 B2 * | 2/2010 | Brinkhous et al. | 439/35 |
| 2003/0222449 A1 | 12/2003 | Wang | |
| 2004/0135334 A1 * | 7/2004 | Cheng | 280/87.03 |
| 2004/0232638 A1 | 11/2004 | Lo | |
| 2005/0173180 A1 | 8/2005 | Hypes | |

FOREIGN PATENT DOCUMENTS

| | | |
|---|---|---|
| GB | 2 088 796 A | 6/1982 |
| JP | H06 78955 A | 3/1994 |

* cited by examiner

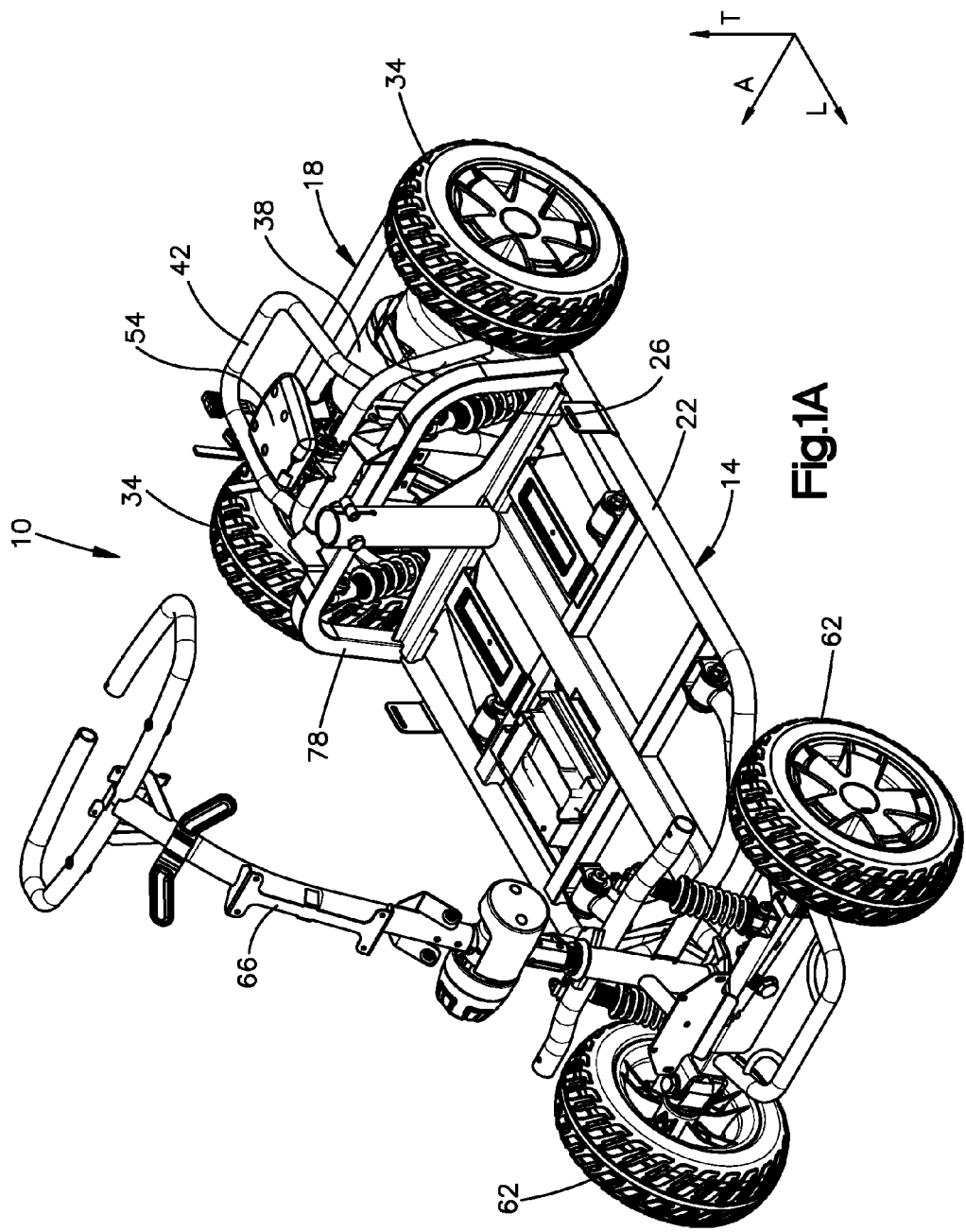

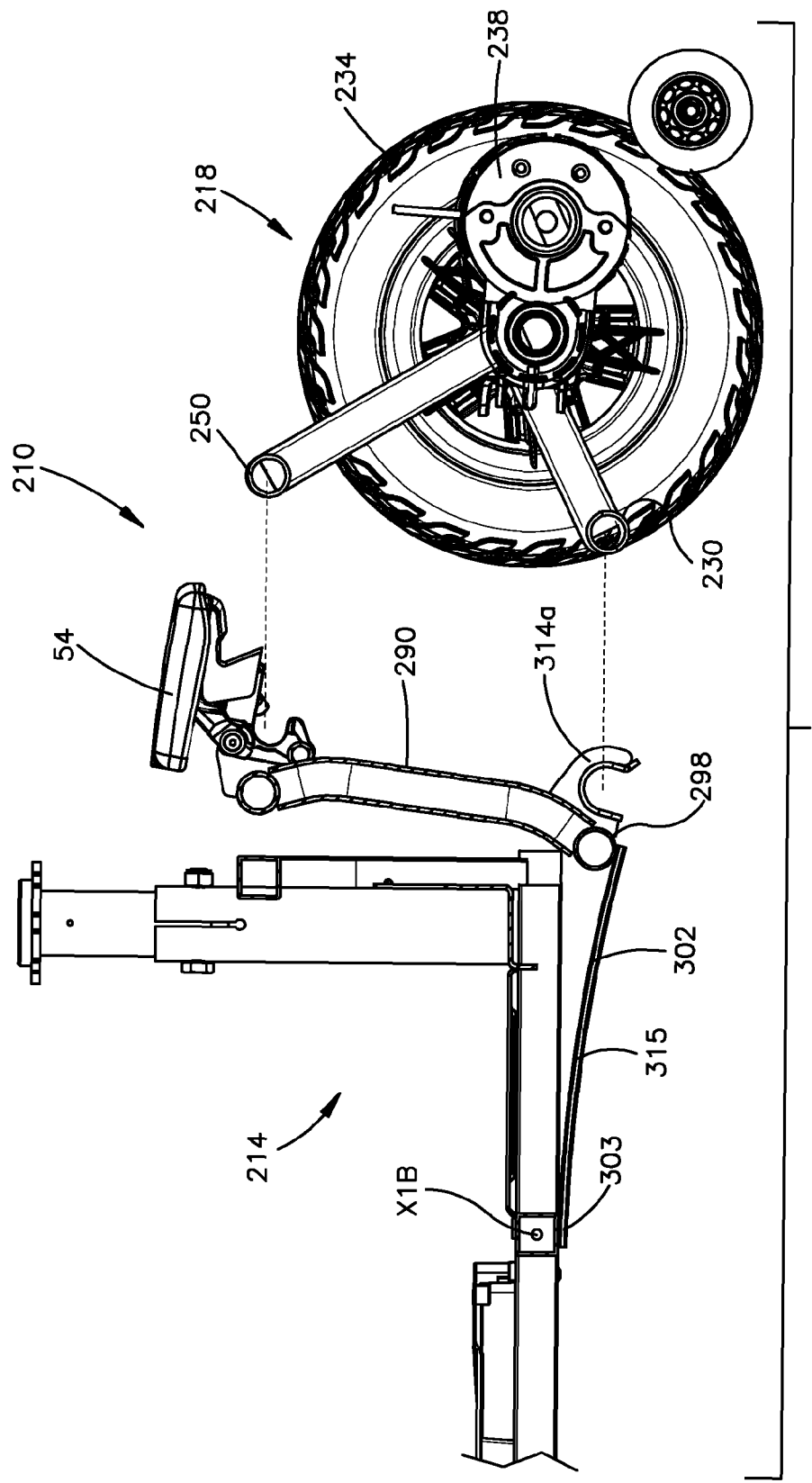

SUSPENSION FOR SCOOTER

BACKGROUND

Scooters and other personal mobility vehicles help people having reduced mobility to lead a more active lifestyle. Transporting scooters in a car or van is often troublesome, and many designs address the difficulty in transporting scooters. For example, U.S. patent application Ser. No. 11/386,339 provides a foldable scooter on rollers having a user-friendly latching system. Other designs, such as the Victory 10 scooter available commercially from Pride Mobility Products, have a front portion that is detachable from a rear portion so that each part is lighter for lifting.

Detachable scooters are often synonymous with complex design, as electrical control wiring, electrical power wiring, and brake cabling often must extend across the detachable segments of a detachable scooter. Furthermore detachable scooters typically have poor rear suspensions. It would be desirable for a detachable scooter to have an improved rear suspension.

SUMMARY

In one embodiment, a personal mobility scooter can include a front frame portion and a rear frame portion detachably coupled to the front frame portion. The front frame portion can have a front frame, at least one front wheel rotatably coupled to the front frame, and a rear suspension coupled to the front frame. The rear suspension can have at least one biasing member. The rear frame portion can have at least one rear attachment member, a pair of drive wheels, and at least one drive configured to power the drive wheels. The rear suspension is configured to (i) engage the at least one rear attachment member when the rear frame portion is coupled to the front frame portion and (ii) remain with the front frame portion when the rear frame portion is detached from the front frame portion.

In another embodiment, the personal mobility scooter can include a front frame portion and a rear frame portion detachably coupled to the front frame portion. The front frame portion can have a front frame, at least one front wheel rotatably coupled to the front frame, and a rear suspension pivotably coupled to the front frame at a first pivot axis. The rear frame portion can have a pair of drive wheels that define a drive wheel axis and at least one drive configured to power the drive wheels. The rear suspension can define an effective swing arm length measured from the drive wheel axis to the first pivot axis that is at least 10 inches when the rear frame portion is coupled to the front frame portion.

In another embodiment, the personal mobility scooter a front frame portion and a rear frame portion detachably coupled to the front frame portion. The front frame portion can have a front frame, at least one front wheel rotatably coupled to the front frame, and a rear suspension. The rear suspension can have a suspension frame that is pivotably coupled to the front frame at a first pivot axis and at least one biasing member pivotably coupled to the front frame at a second pivot axis and to the suspension frame at a third pivot axis. The rear frame portion can have a rear frame, a pair of drive wheels rotatably coupled to the rear frame, and at least one drive configured to power the drive wheels. The suspension frame is configured to engage the rear frame when the rear frame portion is coupled to the front frame portion.

BRIEF DESCRIPTION OF THE DRAWINGS

The foregoing summary, as well as the following detailed description of an example embodiment of the application, will be better understood when read in conjunction with the appended drawings, in which there is shown in the drawings example embodiments for the purposes of illustration. It should be understood, however, that the application is not limited to the precise systems and methods shown. In the drawings:

FIG. 1A is a perspective view of a scooter in accordance with an embodiment of the invention, the scooter having a front frame portion and a rear frame portion that is detachable from the front frame portion;

FIG. 4B is a crows-sectional view of the rear suspension shown in FIG. 4A.

DETAILED DESCRIPTION OF ILLUSTRATIVE EMBODIMENTS

Figure 1B:
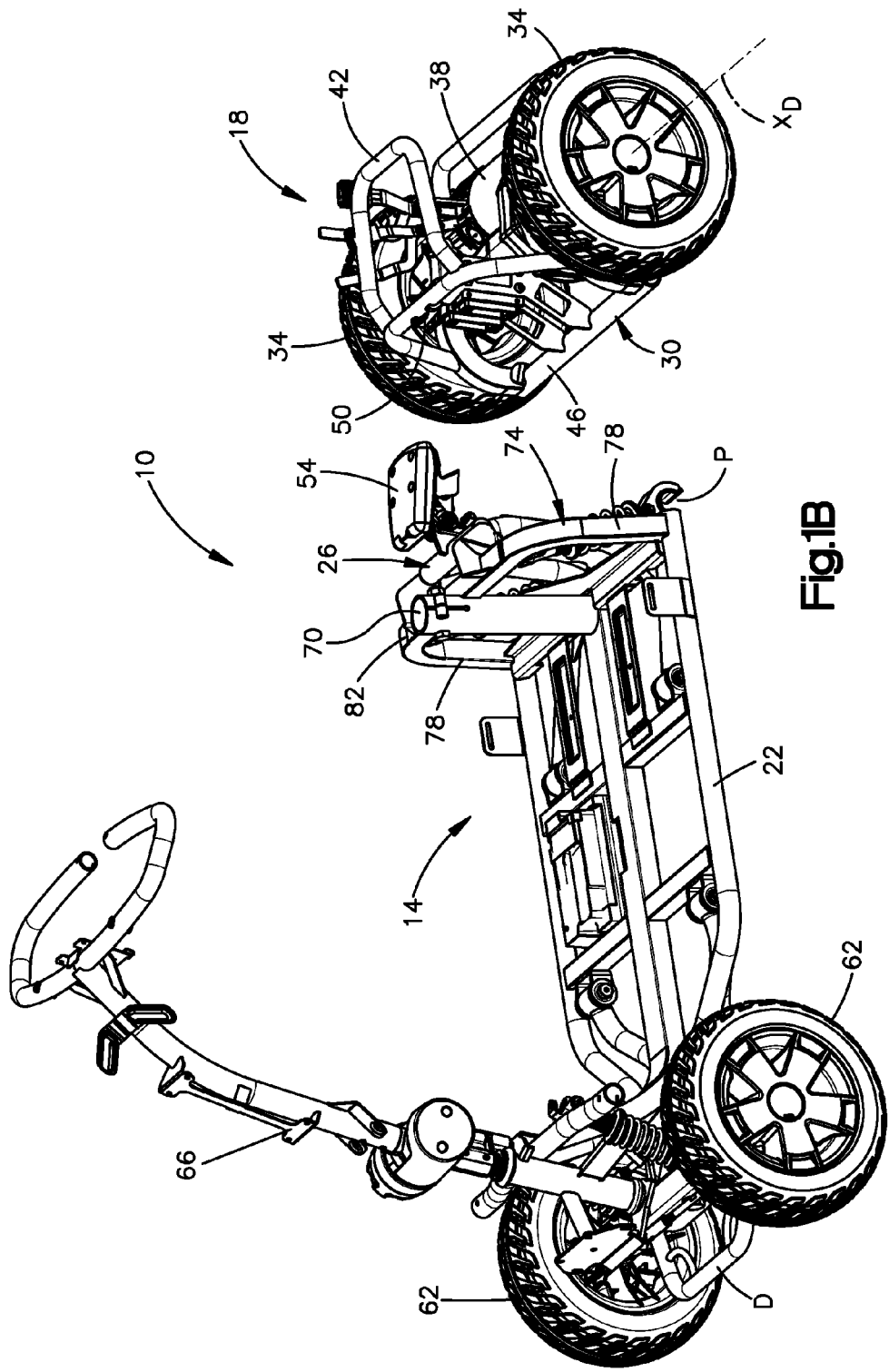
FIG. 1B is a perspective view of the scooter shown in FIG. 1A with the rear frame portion detached from the front frame portion.

Referring to FIGS. 1A and 1B, a personal mobility scooter 10 includes a front frame portion 14 and a rear frame portion 18 that is detachably coupled to the front frame portion 14, and a seat that is detachably coupled to the front frame portion 14. As shown in FIG. 1A, the personal mobility scooter is elongate along a first or longitudinal direction L that is also the direction of movement of the scooter 10. The scooter 10 also has a width that extends along a second or lateral direction A and a height that extends along a third or transverse direction T.

As shown in FIGS. 1A and 1B, the front frame portion 14 includes a front frame 22 and a rear suspension 26 coupled to the front frame 22. The rear frame portion 18 includes at least one rear attachment member 30, a pair of drive wheels 34 that define a drive wheel axis $X_D$ that extends along the lateral direction A, and at least one drive 38 configured to power the drive wheels 34. The rear suspension 26 is configured engage the at least one rear attachment member 30 when the rear frame portion 18 is coupled to the front frame portion 14 and is further configured to remain with the front frame portion 14 when the rear frame portion 18 is detached from the front frame portion 14. The scooter 10 can be operated when the rear frame portion 18 is coupled to the front frame portion 14 as shown in FIG. 1A. Alternatively, the scooter 10 can be stored when the rear frame portion 18 is detached from the front frame portion 14 as shown in FIG. 1B. That is, the scooter 10 can be partially disassembled for storage or transport, for example, in an automobile trunk, by removing the seat from the front frame portion 14, and by detaching the rear frame portion 18 from the front frame portion 14.

As shown in FIGS. 1A and 1B, the rear frame portion 18 further includes a rear frame 42. As shown, the drive wheels 34 are rotatably coupled to the rear frame 42 and the at least one drive 38 is supported by the rear frame 42 such that the rear frame 42, drive wheels 34, and at least one drive 38 define a single unit when the rear frame portion 18 is detached from the front frame portion 14. As shown in FIG. 1B, the rear frame 42 includes a crossbar 46 that is elongate along the lateral direction A and is configured to engage the rear suspension 26 when the rear frame portion 18 is coupled to the front frame portion 14. In this way, the crossbar 46 defines the at least one rear attachment member 30. As shown, the rear frame 42 further includes a coupling member 50 that is configured to mate with a latch 54 on the rear suspension 26 to thereby lock the rear frame portion 18 to the front frame portion 14 when the rear frame portion 18 is coupled to the front frame portion 14. While the rear suspension 26 engages the rear frame 42 in the illustrated embodiment, it should be appreciated, that the rear suspension 26 can engage other portions of the rear frame portion 18 when the rear frame portion 18 is coupled to the front frame portion 14. For example, the rear suspension 26 can engage rear attachment members on the drives as desired.

With continued reference to FIGS. 1A and 1B, the front frame 22 is elongate along the longitudinal direction L and defines a front end D and a rear end P that is spaced from the front end D along the longitudinal direction L. The front frame portion 14 further includes at least one front wheel 62 rotatably coupled to the front frame 22 proximate to the front end D and the rear suspension 26 is coupled to the front frame 22 proximate to the rear end P. In the illustrated embodiment, the front frame portion 14 includes two front wheels 62 rotatably coupled to the front frame 22 and a tiller 66 for steering the scooter 10. In particular, the front wheels 62 are operatively coupled to the tiller 66 such that the front wheels 62 are pivotable in response to actuation or turning of the tiller 66.

Figure 2:
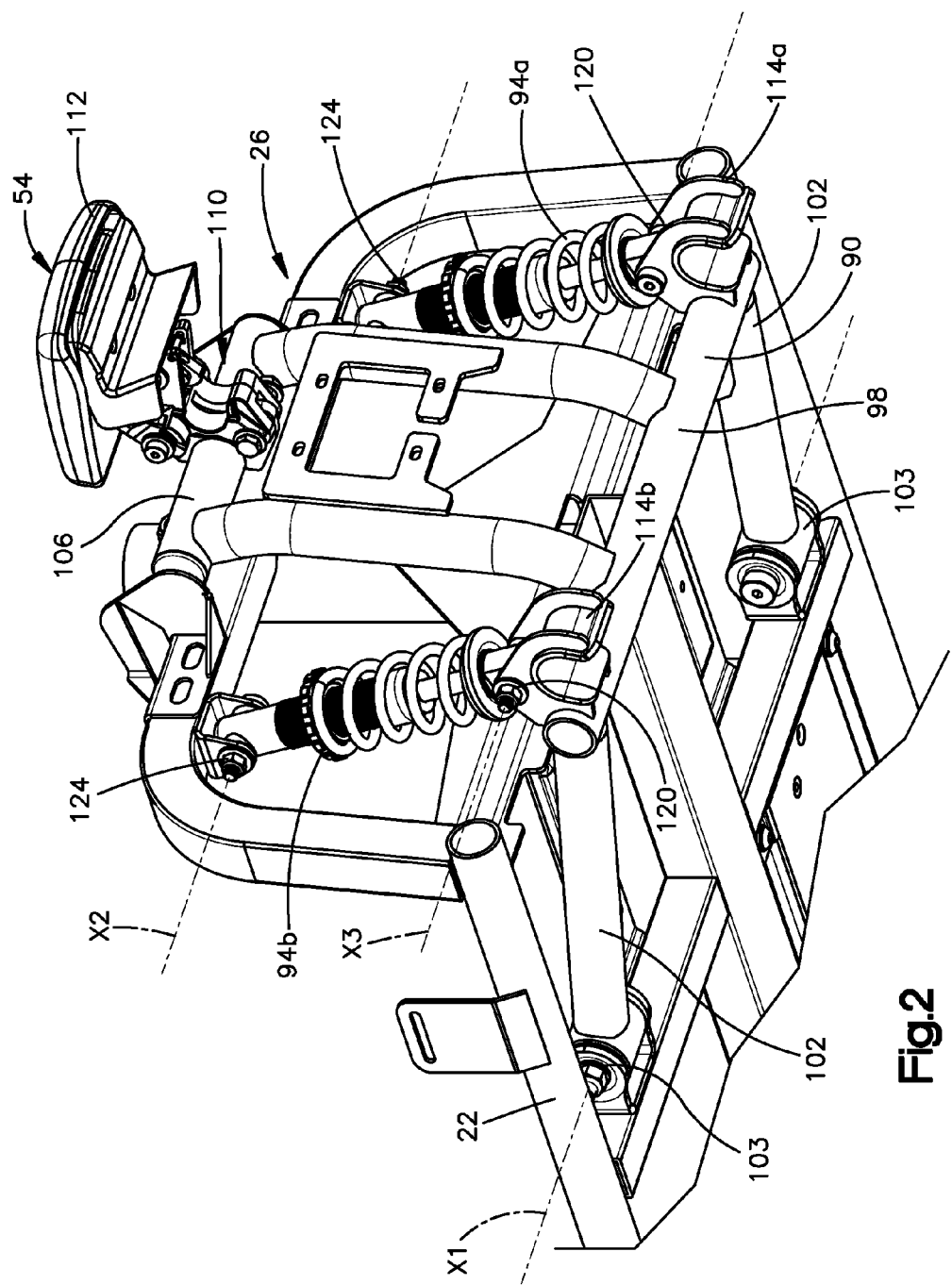
FIG. 2 is a rear perspective view of the front frame portion of FIG. 1B, the front frame portion including a front frame and a rear suspension configured to couple to the rear frame portion when the rear frame portion is coupled to the front frame portion.

As shown in FIGS. 1A, 1B, and 2, the front frame 22 includes a seat post 70 that protrudes upward along the transverse direction T and a U-shaped bar 74 that extends along the lateral direction A. The seat post 70 is configured to receive the seat to thereby couple the seat to the front frame portion 14. The U-shaped bar 74 is proximal to the seat post 70 and includes a pair of upward extending support members 78 and a laterally extending support member 82 that couples the upward extending support members 48 together. As will be described, the rear suspension 26 is coupled to both the laterally extending support member 82 and to another portion of the front frame 22 that is forward of the U-shaped bar 74 toward the front wheels 62 and below the laterally extending support member 82. It should be appreciated, however, that the U-shaped bar 74 can have any configuration as desired. Furthermore, it should be appreciated that in some embodiments the rear suspension 26 is not connected to the U-shaped bar 74 at all.

As shown in FIG. 2, the rear suspension 26 includes a suspension frame 90 that is pivotably coupled to the front frame 22 at a first pivot axis $X_1$ and at least one biasing member 94 pivotably coupled to the front frame 22 at a second pivot axis $X_2$ and to the suspension frame 90 at a third pivot axis $X_3$. As the scooter 10 is moving over uneven terrain the suspension frame 90 will pivot relative to the front frame 22 about the first pivot axis $X_1$. The pivotal connection of the biasing members 94 allows the biasing members 94 to move as the suspension frame 90 pivots relative to the front frame 22.

As shown in FIG. 2, the suspension frame 90 includes a crossbar 98 that is elongate along the lateral direction A and a pair of pivot arms 102 that extend forward from respective ends of the crossbar 98 toward the front wheels 62 along the longitudinal direction L. In the illustrated embodiment, each pivot arm 102 is fixedly coupled to the respective end of the cross bar 98 and is pivotably coupled to the front frame 22 at a respective pivot 103. As shown, the pivots 103 define the first pivot axis $X_1$. It should be appreciated, however, that the pivot arms 102 can extend from any portion of the crossbar 98 and are not limited to being coupled to respective ends of the crossbar 98 as illustrated.

With continued reference to FIG. 2, the suspension frame 90 further includes an upstanding support 106 that protrudes upward from the crossbar 98 along the transverse direction T. The upstanding support 106 extends from the crossbar 98 between the pivot arms 102 and is configured to pivot with the crossbar 98 about the first pivot axis $X_1$. As shown, the latch 54 is coupled to or otherwise fixed to the upstanding support 106. As stated before, the latch 54 is configured to engage the coupling member 50 of the rear frame 42 to thereby lock the rear frame portion 18 to the front frame portion 14 when the rear frame portion 18 is coupled to the front frame portion 14. Because the latch 54 is fixed to the upstanding support 106, the latch 54 along with the suspension frame 90 are together pivotable about the first pivot axis $X_1$.

As shown in FIG. 2, the latch 54 includes a channel 110 that is configured to receive the coupling member 50 of the rear frame 42 and a lock member 112 that is configured retain the coupling member 50 within the channel 110. When the coupling member 50 is to be released from the channel 110, the lock member 112 can be lifted or otherwise actuated. The latch 54 is similar to the latch shown and described in U.S. Publication No. 61/250,684, filed Oct. 12, 2009 the contents of which are hereby incorporated by reference herein.

Figure 3A:
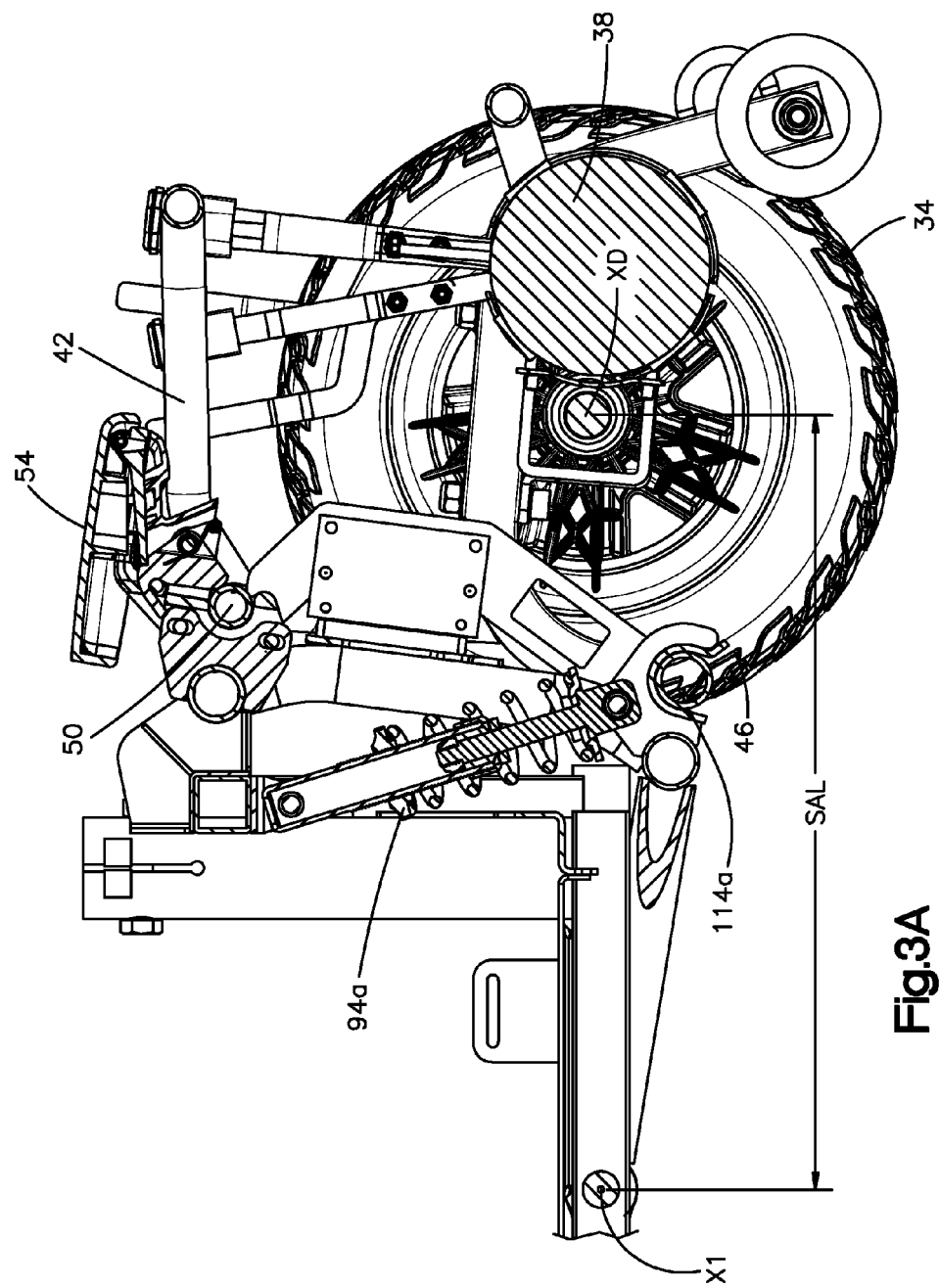
FIG. 3A is a cross-sectional view of the rear suspension shown in FIG. 2 coupled to the rear frame portion.
Figure 3B:
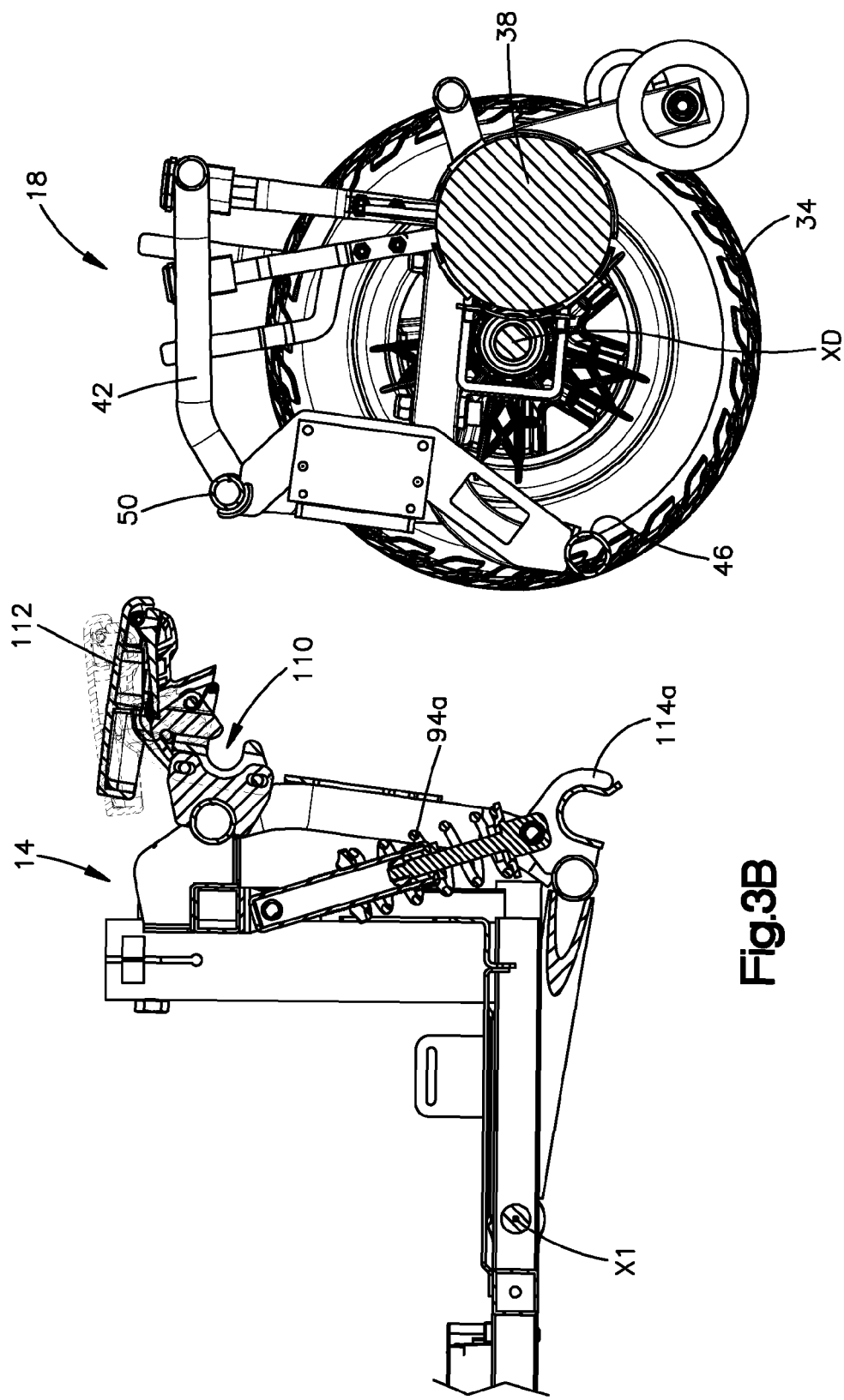
FIG. 3B is a cross-sectional view of the rear suspension shown in FIG. 3A decoupled from the rear frame portion.

As shown in FIGS. 2, 3A, and 3B, the rear suspension 26 and in particular the cross bar 98 includes a first suspension attachment member 114a and a second suspension attachment member 114b that are each configured to attach to the rear frame 42 when the rear frame portion 18 is coupled to the front frame portion 14. In the illustrated embodiment, the first and second suspension attachment members 114a and 114b are configured as attachment hooks that are configured to receive the crossbar 46 of the rear frame 42 when the rear frame portion 18 is coupled to the front frame portion 14. It should be appreciated, however, that the first and second suspension attachment members 114a and 114b can have other configurations as desired.

With continued reference to FIG. 2, the at least one biasing member 94 includes a first biasing member 94a and a second biasing member 94b that are each pivotably coupled to the crossbar 98 at a respective first biasing member pivot 120 and to the front frame 22 at a respective second biasing member pivot 124. In the illustrated embodiment, the biasing members 94a and 94b are springs, though it should be appreciated, that the biasing members 94a and 94b can have other configurations as desired. For example, the biasing members 94a and 94b can be configured as a hydraulic strut as desired. As shown in FIGS. 2 and 3A, the biasing members 94a and 94b are aligned with the first and second suspension attachment members 114a and 114b. In the illustrated embodiment, the first biasing member pivots 120 are integrated into the first and second attachment members 114a and 114b. In this way, the first and second biasing members 94a and 94b are pivotably coupled to the first and second suspension attachment members 114a and 114b. It should be appreciated, however, that the biasing members 94a and 94b can be pivotalby coupled to any portion of the crossbar 98, as desired.

As shown in FIGS. 3A and 3B, the first biasing member pivots 120 define the third pivot axis $X_3$ and the second biasing member pivots 124 define the second pivot axis $X_2$. And as shown in FIG. 3A, the first pivot axis $X_1$ is forward of the second pivot axis $X_2$ such that the first pivot axis $X_1$ is closer to the front wheels 62 than the second pivot axis $X_2$. Because the first pivot axis $X_1$ is spaced closer to the front wheels 62 the rear suspension 26 can define an effective swing arm length $SA_L$ measured from the drive wheel axis $X_D$ to the first pivot axis $X_1$ that is at least 10 inches (preferably at least 12 inches) when the rear frame portion 18 is coupled to the front frame portion 14. It should be appreciated, however, that the first pivot axis $X_1$ can be positioned anywhere along the front frame 22 such that the rear suspension 26 can have any desired swing arm length $SA_L$.

In reference to FIG. 3A, when the rear frame portion 18 is to be coupled to the front frame portion 14, the rear frame portion 18 can be positioned adjacent the front frame portion 14 such that the crossbar 46 of the rear frame 42 is received by the attachment hooks 114a and 114b and the coupling member 50 is received by the channel 110 of the latch 54. The lock member 112 can then be actuated to thereby lock the rear frame portion 18 to the front frame portion 14.

As shown in FIG. 3B, the rear frame portion 18 can be detached from the front frame portion 14 by actuating the lock member 112. Once in an unlocked position the coupling member 50 can be removed from the channel 110 and the front frame portion 14 can be lifted upward to thereby detach the rear frame portion 18 from the front frame portion 14. As shown in FIG. 3B, the rear suspension 26 remains with the front frame portion 14 when the rear frame portion 18 is detached. Such a design not only allows for a greater swing arm length $SA_L$ for the rear suspension 26 but also helps reduce the overall weight of the rear frame portion 18.

Figure 4A:
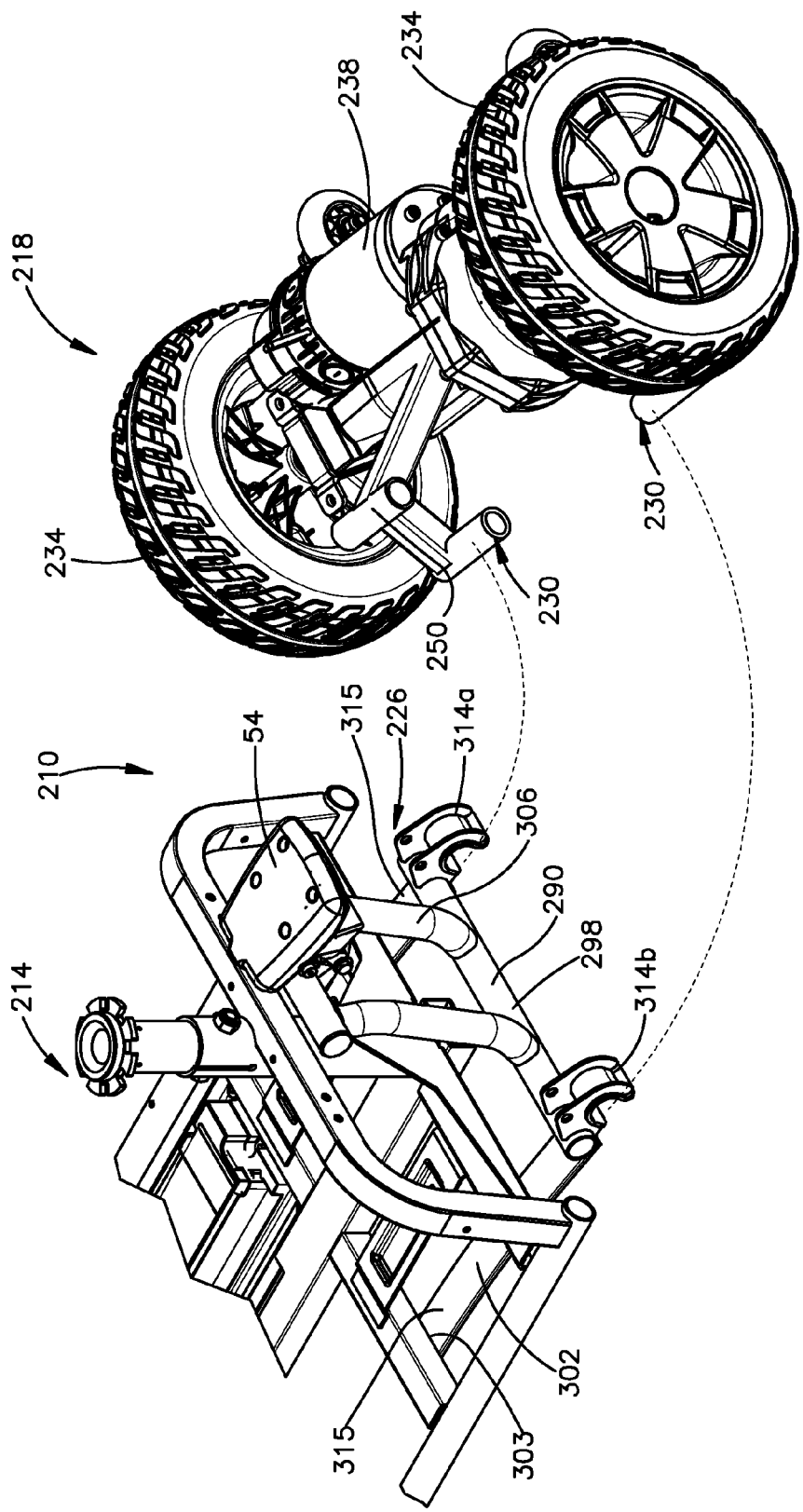
FIG. 4A is a rear perspective view of a rear suspension in accordance with another embodiment, the rear suspension having a leaf spring.

Now in reference to FIGS. 4A and 4B, a scooter 210 in accordance with another embodiment can include a front frame portion 214 and a rear frame portion 218 that is detachably coupled to the front frame portion 214. The scooter 210 is similar to scooter 10 and operates in a similar manner unless otherwise described. As shown in FIG. 4A, the front frame portion 214 includes a rear suspension 226 having at least one biasing member that is incorporated into the suspension frame. As shown in FIG. 4A, the rear suspension 226 includes a suspension frame 290 that is rigidly coupled to the front frame 22 at a first joint axis $X_{1B}$. As the scooter 10 is moving over uneven terrain the suspension frame 290 will pivot relative to the front frame 22 about the first joint axis $X_{1B}$. In the embodiment shown in FIGS. 4A and 4B, the rear suspension 226 is only coupled to the front frame 22 at the first joint axis $X_{1B}$, and is void of the second connection as described in the embodiment shown in FIGS. 1A and 1B.

With continued reference to FIG. 4A, the rear frame portion 218 includes at least one rear attachment member 230, a pair of drive wheels 234, at least one drive 238 configured to power the drive wheels 234, and a coupling member 50. In the illustrated embodiment, the rear frame portion 218 includes two rear attachment members 230. The rear suspension 226 is configured engage the two rear attachment members 230 when the rear frame portion 218 is coupled to the front frame portion 214 and is further configured to remain with the front frame portion 214 when the rear frame portion 218 is detached from the front frame portion 214.

As shown in FIGS. 4A and 4B, the suspension frame 290 includes a crossbar 298 that is elongate along the lateral direction A and a pair of arms 302 that extend forward from respective ends of the crossbar 298 toward the front wheels 62 along the longitudinal direction L. In the illustrated embodiment, each arm 302 is fixedly coupled to the respective end of the cross bar 298 and is fixedly coupled to the front frame 22 at a respective joint 303. As shown, the joints 303 define the first joint axis $X_{1B}$. It should be appreciated, however, that the arms 302 can extend from any portion of the crossbar 298 and are not limited to being coupled to respective ends of the crossbar 298 as illustrated.

With continued reference to FIG. 4A, similar to the suspension frame 90, the suspension frame 290 further includes an upstanding support 306 that protrudes upward from the crossbar 298 along the transverse direction T. The upstanding support 306 extends from the crossbar 298 between the arms 302 and is configured to pivot with the crossbar 298 about the first joint axis $X_{1B}$. As shown, the latch 54 is coupled to or otherwise fixed to the upstanding support 306. As stated before, the latch 54 is configured to engage the coupling member 250 of the rear frame portion 218 to thereby lock the rear frame portion 218 to the front frame portion 214 when the rear frame portion 218 is coupled to the front frame portion 214.

As shown in FIGS. 4A, and 4B, the rear suspension 226 and in particular the cross bar 298 includes a first suspension attachment member 314a and a second suspension attachment member 314b that are each configured to attach to the rear frame portion 218 when the rear frame portion 218 is coupled to the front frame portion 214. In the illustrated embodiment, the first and second suspension attachment members 314a and 314b are configured as attachment hooks that are configured to receive the respective attachment members 230 when the rear frame portion 218 is coupled to the front frame portion 214.

With continued reference to FIGS. 4A and 4B, the at least one biasing member can be incorporated into the suspension frame 290. In particular, the arms 302 can be configured as leaf springs 315 as illustrated. Because the arms 302 are configured as leaf springs 315 the rear suspension 226 will pivot about the leaf springs 315 connections to the front frame 22 (i.e. the pivots 303). The stiffness of the rear suspension 226 can depend on the material the leaf springs 315 are made from, the thickness of the leaf springs 315, the width of the leaf springs 315, and/or the length of the leaf springs 315. As shown in FIG. 4A, the leaf springs 315 (i.e. biasing members) are aligned with the first and second suspension attachment members 314a and 314b. It should be appreciated, however, that the leaf springs 315 can be out of line with attachment members 314a and 314b as desired.

The rear suspension 226 functions in a similar manner as the rear suspension 26 shown in FIGS. 1A and 1B. Therefore, like the rear suspension 26, the rear suspension 226 is configured to remain with the front frame portion 214 when the rear frame portion 218 is detached from the front frame portion 214.

While the foregoing description and drawings represent the preferred embodiment of the present invention, it will be understood that various additions, modifications, combinations and/or substitutions may be made therein without departing from the spirit and scope of the invention as defined in the accompanying claims. In particular, it will be clear to those skilled in the art that the invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components, which are particularly adapted to specific environments and operative requirements without departing from the principles of the invention. In addition, features described herein may be used singularly or in combination with other features. For example, features described in connection with one component may be used and/or interchanged with features described in another component. For example, the rear frame portion 218 can be detachably coupled to the front portion 14 as desired or the rear frame portion 18 can be detachably coupled to the front frame portion 214 as desired. The presently disclosed embodiment is therefore to be considered in all respects as illustrative and not restrictive, the scope of the invention being indicated by the appended claims, and not limited to the foregoing description.

It will be appreciated by those skilled in the art that various modifications and alterations of the invention can be made without departing from the broad scope of the appended claims. Some of these have been discussed above and others will be apparent to those skilled in the art.

What is claimed:

1. A personal mobility scooter comprising:
   a front frame portion including a front frame, at least one front wheel rotatably coupled to the front frame, and a rear suspension coupled to the front frame, the rear suspension including at least one biasing member and at least one rear suspension attachment member aligned with the at least one biasing member; and
   a rear frame portion detachably coupled to the front frame portion, the rear frame portion including at least one rear frame attachment member that engages the at least one rear suspension attachment member, a pair of drive wheels, and at least one drive that powers the drive wheels,
   wherein the rear suspension (i) engages the at least one frame attachment member when the rear frame portion is coupled to the front frame portion and (ii) remains with the front frame portion when the rear frame portion is detached from the front frame portion.

2. The personal mobility scooter of claim 1, wherein the at least one rear suspension attachment member is a first suspension attachment member configured to attach to the at least one rear frame attachment member when the rear frame portion is coupled to the front frame portion.

3. The personal mobility scooter of claim 2, the at least one rear suspension attachment member includes a second suspension attachment member configured to attach to the at least one rear frame attachment member when the rear frame portion is coupled to the front frame portion.

4. The personal mobility scooter of claim 3, wherein that at least one biasing member includes (i) a first biasing member that is pivotably coupled to the first suspension attachment member at a first end and is pivotably coupled to the front frame at a second end, and (ii) a second biasing member that is pivotably coupled to the second suspension attachment member at a first end and is pivotably coupled to the front frame at a second end.

5. The personal mobility scooter of claim 4, wherein the rear frame portion includes a rear frame and the drive wheels are rotatably coupled to the rear frame.

6. The personal mobility scooter of claim 3, wherein the rear frame includes a crossbar and the first and second suspension attachment members are each attachment hooks that are configured to receive the crossbar when the rear frame portion is coupled to the front frame portion.

7. The personal mobility scooter of claim 1, wherein (i) the rear suspension includes a suspension frame having a crossbar and a pair of pivot arms extending forward from the crossbar toward the at least one front wheel, (ii) the at least one biasing member includes a first biasing member and a second biasing member that are each pivotably coupled to the crossbar at a first end and to the front frame at a second end, and (iii) the pivot arms are pivotably coupled to the front frame forward of the second ends of the first and second biasing members.

8. The personal mobility scooter of claim 7, wherein the rear suspension defines an effective swing arm length measured from an axis of the drive wheels to an axis of the pivot arms that is at least 10 inches.

9. The personal mobility scooter of claim 7, wherein the rear suspension defines an effective swing arm length measured from an axis of the drive wheels to an axis of the pivot arms that is at least 12 inches.

10. The personal mobility scooter of claim 7, further comprising a latch coupled to the suspension frame, the latch being configured to engage the rear frame portion to thereby detachably couple the rear frame portion to the front frame portion.

11. The personal mobility scooter of claim 10, wherein the entire suspension frame and latch are pivotable relative to the front frame.

12. The personal mobility scooter of claim 1, wherein the rear suspension includes a suspension frame having a pair of arms that are coupled to the front frame, each arm being configured as a leaf spring such that the arms each define a respective biasing member.

13. A personal mobility scooter comprising:
    a front frame portion including a front frame, at least one front wheel rotatably coupled to the front frame, and a rear suspension having a suspension frame, the suspension frame including a crossbar and a pair of pivot arms that extend forward from the crossbar toward the at least one front wheel, the pair of pivot arms being pivotably coupled to the front frame at a first pivot axis, the rear suspension further including at least one biasing member pivotably coupled to the front frame at a second pivot axis and to the crossbar at a third pivot axis; and
    a rear frame portion detachably coupled to the front frame portion, the rear frame portion including a rear frame, a pair of drive wheels rotatably coupled to the rear frame, and at least one drive that powers the drive wheels,
    wherein the suspension frame engages the rear frame when the rear frame portion is coupled to the front frame portion.

14. The personal mobility scooter of claim 13, wherein the suspension frame includes a first attachment member configured to attach to the rear frame when the rear frame portion is coupled to the front frame portion.

15. The personal mobility scooter of claim 14, wherein the suspension frame further includes a second attachment member configured to attach to the rear frame when the rear frame portion is coupled to the front frame portion.

16. The personal mobility scooter of claim 15, wherein the rear frame includes a crossbar and the first and second attachment members are each attachment hooks that are configured to receive the crossbar when the rear frame portion is coupled to the front frame portion.

17. The personal mobility scooter of claim 13, wherein the rear suspension defines an effective swing arm length measured from an axis of the drive wheels to the first pivot axis that is at least 10 inches.

18. The personal mobility scooter of claim 13, wherein the rear suspension defines an effective swing arm length measured from an axis of the drive wheels to the first pivot axis that is at least 12 inches.

* * * * *